April 16, 1968 G. A. KEMENY 3,378,621
ELECTRODE TIP FAILURE DETECTOR
Filed March 10, 1967
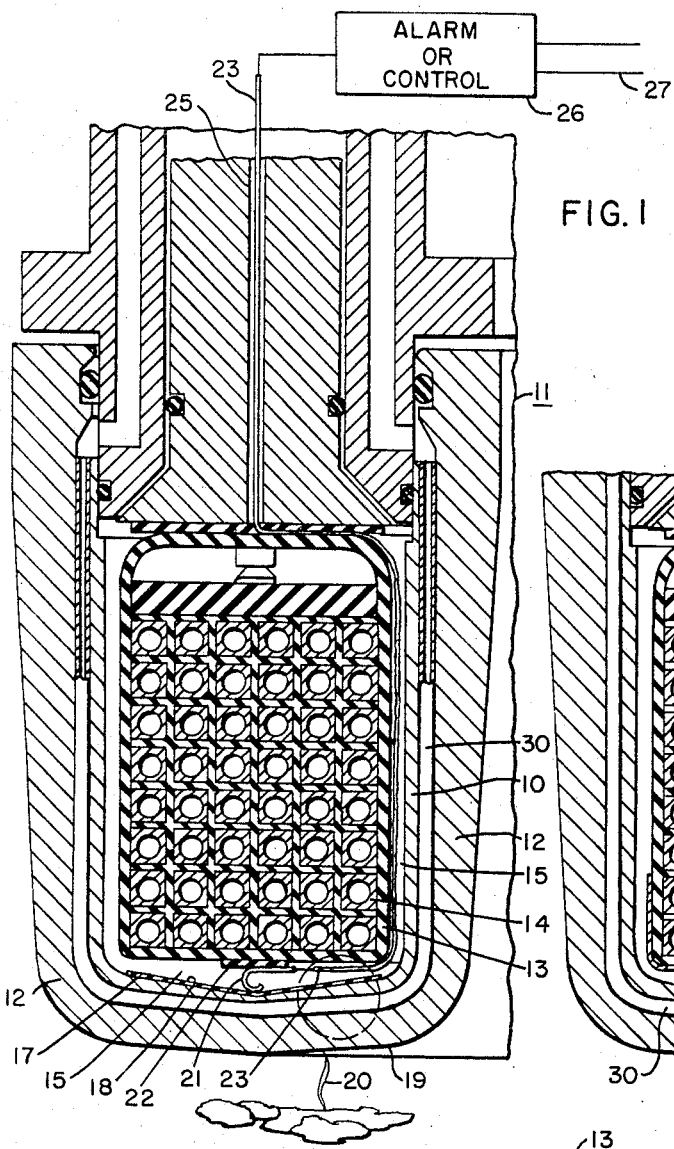
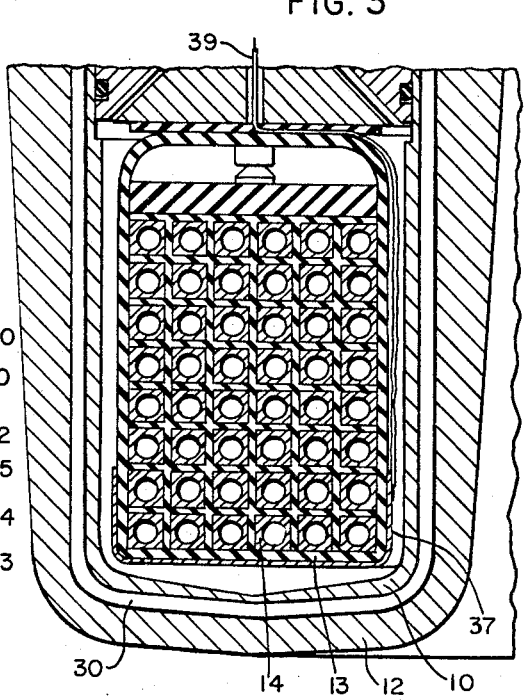
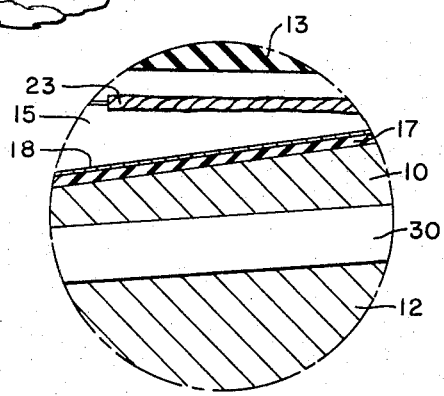
WITNESSES
Helen M. Farkas
James F. Young
INVENTOR
George A. Kemeny
BY Maury I. Hull
ATTORNEY

United States Patent Office 3,378,621
Patented Apr. 16, 1968

3,378,621
ELECTRODE TIP FAILURE DETECTOR
George A. Kemeny, Export, Pa., assignor to Westinghouse Electric Corporation, Pittsburgh, Pa., a corporation of Pennsylvania
Filed Mar. 10, 1967, Ser. No. 622,188
12 Claims. (Cl. 13—18)

ABSTRACT OF THE DISCLOSURE

A detector for an electrode having a hollow tip with a fluid flow passageway or passageways for conducting fluid near the arcing surface of the tip, and having a field coil disposed within the hollow tip, comprises a thin layer of insulation on the inside metallic wall of the tip near the arcing surface, and a coating of thin metal foil or metal paint on the interior exposed surface of the insulating layer. A lead wire is connected to the metal foil or metal paint and may extend outside of the electrode to an indicating device. Other circuit means are also used for getting a signal from the failure detector to a utilization device. When a burn through of the electrode tip occurs, the arc burns through the thin layer of insulation and makes contact with the thin metal foil or metallic paint producing a potential on the lead which provides an indication that burn through has occurred. In another embodiment, I coat the bottom of the insulating coil housing with foil or metal paint, and a lead is connected thereto. In this embodiment, no burn through of the insulating layer is necessary.

Field of the invention

The invention relates to electrodes for use in arc furnaces and of the type which have a hollow electrode tip with fluid flow passageways near the arcing surface for cooling the electrode tip, and provides a tip failure device including a thin layer of metal foil or metal paint electrically insulated from the electrode tip; when the electrode tip is burned through by the arc, the arc makes contact with the layer of thin metal foil or paint, producing a potential thereon which is used to give an indication of tip failure.

Description of the prior art

Quick detection of failure or burn through of an electrode tip is important for a number of reasons, including: (1) Failure detection is desirable at an early stage of failure i.e., before a large hole is burned through the electrode, which is likely to damage the field coil; field coils are expensive. (2) Early detection limits loss of coolant to the furnace charge and hence reduces likelihood of extensive damage which may result from major coolant loss. Prior art schemes for detecting tip failure ascertain that a portion of the fluid flow to the electrode is being lost, but since the amount of fluid flow lost through a hole caused by burn through may not be over 2% of the total fluid, detection of tip failure by this method is unreliable. I overcome this disadvantage by providing a sensitive means for quickly obtaining an electrical signal resulting from tip failure and utilizing this signal to indicate failure.

Summary

In summary, my invention relates to detecting the failure of an electrode tip caused by the arc spot burning through the electrode tip, and includes means within the electrode for obtaining an electrical signal when burn through occurs, and utilizing this signal to give an indication of tip failure. In one embodiment in an electrode having a cavity in the tip, I coat the inside metallic wall of the tip near the arcing surface with a thin layer of insulation, which insulation has on the side thereof opposite to the side facing the arcing surface a layer of metal foil or metal paint with lead means connected to this electricity conducting layer. When burn through of the tip occurs, the insulation is burned through, and the arc quickly makes contact with the thin metal foil or conductive paint producing a signal which is conducted by lead means to an alarm or other device for shutting off the current to the arc.

Brief description of the drawing

FIGURE 1 shows one embodiment of the invention;
FIG. 2 is an enlarged sectional view of a portion of the tip structure of FIG. 1;
FIG. 3 shows another embodiment of the invention in which the metallic paint or metallic foil is disposed on a field coil housing disposed in an annular cavity within the tip, the arc burning through and producing a potential on this metallic foil, the field coil housing being composed of electrically insulating material.

Description of the preferred embodiments

In FIGURE 1 the electrode tip is generally designated 11 having inner and outer annular shells 10 and 12, both U-shaped in cross section, with a space therebetween in which peripherally spaced hollow conduits 30 are disposed. The arcing surface forming means 12 thereof is composed of a material having high thermal conductivity such as copper. Within the annular chamber within the tip is a field coil housing of electrically insulating material 13 enclosing a field coil 14, which housing 13 is spaced from the inner surface of shell 10 providing a cavity 15. On the inner wall of shell 10 at the bottom of the cavity is a thin layer of electrical insulating material 17 having a layer of thin metal foil or metal paint 18 on the surface thereof away from the arcing surface 19 which has arc 20 thereon. The spring means 21 mounted on the bottom of the field coil housing 13 and if necessary insulated therefrom by insulating member 22 makes contact with the layer of metal foil or metal paint 18 and has a lead wire 23 connected thereto, the lead being insulated and running up through the cavity 15 of the electrode and thence through passageway 25, the lead wire 23 being connected to a suitable alarm or control device 26 for giving an alarm or cutting off the current to the arc, the device being shown in block form at 26 and having lead 27 thereto symbolizing means for completing a circuit to obtain from the source of potential supplying the arc a signal for energizing alarm or control devices within block 26.

FIG. 2 is an enlarged fragmentary detail of a portion of the drawing of FIGURE 1, in which like reference characters are used to designate like parts.

It should be understood that insulating layer 17 and conducting layer 18 may also be applied to the sides of the electrode cavity so that a burn through anywhere on the electrode will result in a failure indication.

Means including spring 21 may be electrically connected to one turn of the field coil 14 for using the coil leads or coil conduit to conduct the failure indication signal.

In FIG. 3, a layer of conductive material 37 is deposited or secured to the bottom of the insulated coil housing 13 (and if desired the sides also). This layer of conductive material has lead 39 for conducting a burn through signal therefrom.

It will be readily understood by those skilled in the art that it is necessary to prevent premature electrical contact between conductive layer 37 and the electrode metal on the inner surface of shell 10. This can be accomplished by either physically spacing coating 37 from the wall of shell 10 to provide sufficient electrical insulation (as shown in the drawing of FIG. 3) or else, if desired, an insulating layer (not shown for convenience of illustration) is placed or can be placed on the inside surface or wall of shell 10 between shell 10 and conductive layer 37. The insulation can be placed directly on conductive layer 37, and such a configuration is included as part of my invention.

The drawings and the foregoing written description are illustrative and exemplary only and are not to be interpreted in a limiting sense.

I claim as my invention:

1. In an electrode having an electrode tip at least a portion of which is hollow, the combination of normally electrically conductive means insulated from the remainder of the electrode and disposed in the hollow portion, the conductor means being substantially coextensive with the arcing surface of the tip, and signal transmission means connected to the conductive means, a burn through of the electrode tip as a result of the hot arc spot causing the arc to come in contact with the conductive means producing a tip failure signal thereon.

2. An electrode according to claim 1 in which the electrode tip has a fluid flow passageway therein for conducting heat flux therefrom and has a field coil disposed within the tip, the improvement which comprises insulating material on the wall forming the hollow portion and nearest the arcing surface of the tip, the conductive means including a thin layer of conductive material on the layer of insulating material on the side thereof away from the arcing surface, and circuit means connected to the layer of conductive material.

3. A tip failure detector according to claim 2 including in addition an alarm and control device connected to the circuit means, the arc at the electrode tip when a burn-through occurs rapidly burning through the thin layer of insulating material and reaching the layer of conductive material producing a signal thereon, said signal activating the alarm and control device.

4. An electrode according to claim 3 additionally characterized as having a body portion at least partially composed of conductive material which carries arc current to the tip, and the field coil has conductor means for energizing the field coil from a source of potential different from the source which supplies the arc current, and means connecting the layer of conductive material to the conductor means of the field coil for deriving a burn-through signal between the field coil and the electrode body portion of conductive material.

5. A tip failure detector according to claim 2 including in addition a housing composed of insulating material for the field coil and spring contact means mounted on the bottom of the housing and making electrical connection with the thin conducting layer, said circuit means being connected to the spring contact means.

6. A tip failure detector according to claim 2 in which the layer of conductive material is a thin metallic foil.

7. A tip failure detector according to claim 2 in which the thin layer of conductive material is metallic paint.

8. In an electrode in which the tip forming and arcing surface has a fluid flow passageway within the tip near the arcing surface for the flow of cooling fluid to conduct heat flux away from the arcing surface, and having a field coil inside a coil housing composed of electrically insulating material mounted within the electrode tip and spaced from the inside walls thereof, a tip failure detector including a thin layer of conductive material on the outside surface of the electrically insulating coil housing, and circuit forming means connected to the layer of conductive material for obtaining a tip failure signal when the arc burns through the tip and makes contact with the layer of conductive material.

9. A tip failure detector according to claim 8 wherein the layer of conductive material mounted on the bottom of the insulating housing for the field coil is metal paint.

10. A tip failure detector according to claim 8 wherein the layer of conductive material is metal foil.

11. A tip failure detector according to claim 8 wherein the circuit forming means includes lead means extending through and outside the electrode.

12. A tip failure detector according to claim 1 including in addition alarm and control means connected to the conductive means for utilizing the signal resulting from burn-through to shut off the current which supplies the arc.

References Cited

UNITED STATES PATENTS

| | | | |
|---|---|---|---|
| 2,363,536 | 11/1944 | Leathers | 219—120 |
| 2,400,408 | 5/1946 | Haefelfinger | 200—118 |
| 2,956,210 | 10/1960 | Yatsushiro | 317—15 |

BERNARD A. GILHEANY, *Primary Examiner.*

H. B. GILSON, *Assistant Examiner.*